Patented May 16, 1939

2,158,960

UNITED STATES PATENT OFFICE 2,158,960

HYDROXY-ALKYL ETHERS

Gerald H. Coleman and John W. Zemba, Midland, Mich., assignors to The Dow Chemical Company, Midland, Mich., a corporation of Michigan No Drawing. Application January 12, 1938, Serial No. 184,562

8 Claims. (Cl. 260—613)

This invention concerns hydroxy-alkyl ethers of alkyl phenol compounds having the formula

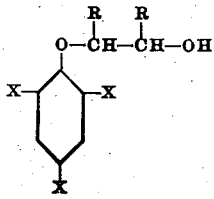

wherein one R represents hydrogen, the other R represents hydrogen or a methyl radical, one X represents a tertiary-alkyl radical containing not more than 5 carbon atoms, another X represents a member of the group consisting of the alkyl and cycloalkyl radicals, and the third X represents a member of the group consisting of the alkyl and cycloalkyl radicals and hydrogen.

We have prepared members of this class of compounds, determined certain physical characteristics thereof whereby they may be readily identified, and found that they are particularly useful in the preparation of compositions for the control of household insect pests, such as fly sprays.

These new compounds may be prepared by reacting a suitable poly-alkyl-phenol compound with a halo-hydrin, e. g. ethylene bromohydrin, propylene chlorohydrin, etc., in the presence of a suitable alkali, e. g. NaOH, KOH, etc.

In preparing our new compounds, the phenol may be dissolved in aqueous alkali and the halohydrin added thereto at a reaction temperature with stirring. If desired, however, the reaction may be carried out by first mixing the phenol with the halo-hydrin and subsequently adding thereto the alkali. While any suitable quantities of reactants may be employed, good yields of the desired products can be obtained when equimolecular proportions of reactants are used. The reaction may be conveniently carried out at the refluxing temperature of the mixture, but lower or higher temperatures may be employed. In certain cases where the reactants are not readily soluble in aqueous alkali, alcohol or other watermiscible organic solvent may be added to the reaction mixture. Following completion of the reaction the mixture is allowed to stand and separate into layers, the oily layer being subsequently separated, and the desired compound isolated therefrom by fractional distillation under reduced pressure or otherwise.

Other methods by which the compounds may be prepared are: (1) the condensation of the alkylene oxides with suitable poly-alkyl-phenols, and (2) the etherification of the dihydroxy paraffin hydrocarbons with poly-alkyl-phenols.

The following examples describe the preparation of certain representative members of our new group of compounds, but are not to be construed as limiting the invention:

Example 1

0.315 mol of 2,4-di-tertiary-butyl-phenol, 0.315 mol of a 42 per cent aqueous azeotrope of ethylene chlorohydrin, and 100 milliliters of ethanol were mixed together and a solution of 0.315 mol of sodium hydroxide in 100 milliliters of water added thereto over a period of 1 hour at temperatures gradually increasing from 65° to 70° C. Stirring was maintained for an additional 2 hours after which the reaction batch was allowed to slowly cool to room temperature. Water was added thereto, whereby an oily layer separated out of the mixture. This layer was taken up in ethyl ether and fractionally distilled whereby 0.1 mol of the beta-hydroxy-ethyl ether of 2, 4-di-tertiary-butyl phenol was obtained as a white crystalline solid melting at 65°–66° C. and boiling at 120°–123° C. at 3 millimeters pressure. This compound was substantially insoluble in water but somewhat soluble in most organic solvents.

Example 2

In a similar manner 1.275 mols of 2-methyl-4-tertiary-butyl phenol, 1.275 mols of sodium hydroxide, and 1.275 mols of ethylene chlorohydrin (42 per cent aqueous azeotrope) were reacted together over a period of 1 hour and at a temperature of 65°–70° C. in the presence of 200 milliliters of water and 100 milliliters of ethanol. Fractionation of the oily reaction product resulted in the isolation of 0.928 mol of the beta-hydroxy-ethyl ether of 2-methyl-4-tertiary-butyl phenol as a white crystalline solid melting at 36°–37° C. and boiling at 130°–132° C. at 3 millimeters pressure.

Example 3

0.436 mol of ethylene chlorohydrin (42 per cent aqueous azeotrope) was added drop-wise over a period of 0.5 hour and with mechanical stirring to a mixture of 0.349 mol of 2-methyl-4,6-di-tertiary-butyl phenol, 0.436 mol of sodium hydroxide, 400 milliliters of water and 400 milliliters of ethanol at temperatures gradually increasing from 80° to 85° C. Stirring was continued for 3.5 hours following the addition after which the reaction product was diluted with water whereby an oily layer separated therefrom. This oily layer was recovered by decantation, washed successively with dilute sulphuric acid and water and fractionally distilled under reduced pressure to obtain the beta-hydroxy-ethyl ether of 2-methyl-4,6-di-tertiary-butyl phenol as a white crystalline product melting at 106° C. and boiling at 110°–114° C. at 3 millimeters pressure.

Among the hydroxy-alkyl ethers which may be prepared by substituting other poly-alkyl-phenol compounds for those shown in the examples are beta-hydroxy-ethyl ether of 2-normal-propyl-4-tertiary-butyl phenol, beta-hydroxy-ethyl ether of 2-tertiary-butyl-4-methyl phenol, beta-hydroxy-ethyl ether of 2,6-diethyl-4-tertiary-butyl phenol, beta-hydroxy-ethyl ether of 2,4-di-tertiary-amyl phenol, beta-hydroxyethyl ether of 2-octyl-4-tertiary-amyl phenol, beta-hydroxy-ethyl ether of 2-tertiary-amyl-4-tertiary-butyl phenol, beta-hydroxy-ethyl ether of 2-tertiary-butyl-6-isobutyl phenol, beta-hydroxy-ethyl ether of 2-tertiary-butyl-4-cyclohexyl phenol, beta-hydroxy-ethyl ether of 2-secondary-amyl-4-tertiary-amyl-6-cyclohexyl phenol, beta-hydroxyethyl ether of 2-tertiary-butyl-4-cyclopentyl phenol, beta-hydroxy-ethyl ether of 2-cyclopentyl-4-methyl-6-tertiary-amyl phenol, hydroxy-propyl ether of 2-methyl-4-tertiary-butyl phenol, hydroxy-propyl ether of 2-methyl-4-tertiary-amyl phenyl, hydroxy-propyl ether of 2-tertiaryamyl-6-ethyl phenol, hydroxy-propyl ether of 2-methyl-4,6-di-tertiary-butyl phenol, hydroxy-propyl ether of 2-cyclohexyl-4-tertiary-amyl phenol, hydroxy-propyl ether of 2,4-dimethyl-6-tertiary-amyl phenol, and hydroxy-propyl ether of 2,6-di-tertiary-butyl phenol.

Certain of the compounds described in the foregoing examples have been tested by the Peet-Grady method (Soap, 8, No. 4, 1932) and found to be particularly valuable as fly spray toxics. For example, a 3 per cent solution of the beta-hydroxy-ethyl ether of 2-methyl-4-tertiary-butyl phenol in kerosene when tested against house flies was found to give an 88 per cent knockdown in 10 minutes and an average kill of 42 per cent in 48 hours. 3 per cent to 5 per cent kerosene solutions of beta-hydroxy-ethyl ethers and hydroxy-propyl ethers of other tertiary-alkyl-alkyl phenols were tested in a similar manner and found to be effective both with respect to knockdown and kill against house flies.

This application is a continuation-in-part of our co-pending applications Serial No. 127,177, filed February 23, 1937, and Serial No. 126,810, filed February 20, 1937.

Other modes of applying the principle of our invention may be employed instead of those explained, change being made as regards the materials employed provided the products described in the following claims be thereby obtained.

We therefore particularly point out and distinctly claim as our invention:

1. A compound having the formula

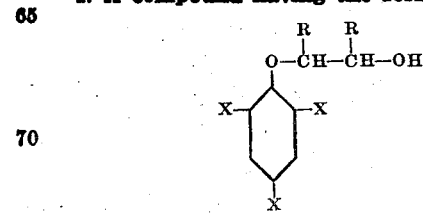

wherein one R represents hydrogen, the other R represents a member of the group consisting of the methyl radical and hydrogen, one X represents a tertiary-alkyl radical containing not more than 5 carbon atoms, another X represents a member of the group consisting of the alkyl and cycloalkyl radicals, and the third X represents a member of the group consisting of the alkyl and cycloalkyl radicals and hydrogen.

2. A compound having the formula

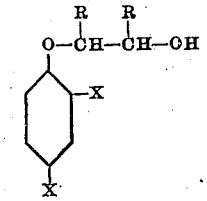

wherein one R represents hydrogen, the other R represents a member of the group consisting of the methyl radical and hydrogen, one X represents a tertiary-alkyl radical containing not more than 5 carbon atoms, and the other X represents a member of the group consisting of the alkyl and cycloalkyl radicals.

3. A compound having the formula

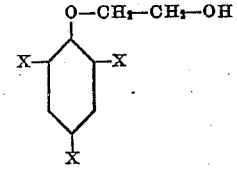

wherein one X represents a tertiary-alkyl group containing not more than 5 carbon atoms, another X represents a member of the group consisting of the alkyl and cycloalkyl radicals, and the third X represents a member of the group consisting of the alkyl and cycloalkyl radicals and hydrogen.

4. A compound having the formula

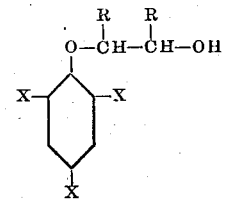

wherein one R represents hydrogen, the other R represents a member of the group consisting of the methyl radical and hydrogen, one X represents a tertiary-butyl radical, another X represents a member of the group consisting of the alkyl and cycloalkyl radicals, and the third X represents a member of the group consisting of the alkyl and cycloalkyl radicals and hydrogen.

5. A compound having the formula

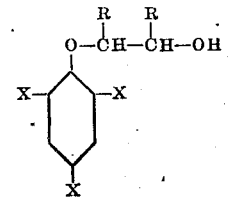

wherein one R represents a hydrogen, the other R represents a member of the group consisting of the methyl radical and hydrogen, one X represents a tertiary-amyl radical, another X represents a member of the group consisting of the alkyl and cycloalkyl radicals, and the third X represents a member of the group consisting of the alkyl and cycloalkyl radicals and hydrogen.

6. A compound having the formula

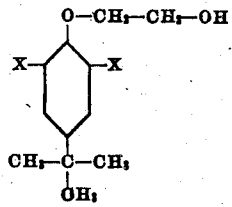

wherein one X represents a member of the group consisting of the alkyl and cycloalkyl radicals, and the other X represents a member of the group consisting of the alkyl and cycloalkyl radicals and hydrogen.

7. Beta-hydroxy-ethyl ether of 2,4-di-tertiary-butyl phenol.

8. Beta-hydroxy-ethyl ether of 2-methyl-4-tertiary-butyl phenol.

GERALD H. COLEMAN.
JOHN W. ZEMBA.